United States Patent [19]
Lumelsky

[11] Patent Number: 6,081,780
[45] Date of Patent: Jun. 27, 2000

[54] TTS AND PROSODY BASED AUTHORING SYSTEM

[75] Inventor: Leon Lumelsky, Stamford, Conn.

[73] Assignee: International Business Machines Corporation, Armonk, N.Y.

[21] Appl. No.: 09/067,526

[22] Filed: Apr. 28, 1998

[51] Int. Cl.[7] .................................................. G10L 7/08
[52] U.S. Cl. .......................................... 704/260; 704/275
[58] Field of Search ..................................... 704/260, 270, 704/235, 272, 275

[56] References Cited

U.S. PATENT DOCUMENTS

| | | | |
|---|---|---|---|
| 4,912,768 | 3/1990 | Benbasat | 704/260 |
| 4,979,216 | 12/1990 | Malsheen et al. | 704/260 |
| 5,177,685 | 1/1993 | Davis et al | 364/443 |
| 5,303,393 | 4/1994 | Noreen et al. | 455/3.2 |
| 5,321,514 | 6/1994 | Martinez | 348/723 |
| 5,384,893 | 1/1995 | Hutchins | 704/267 |
| 5,504,482 | 4/1996 | Schreder | 340/995 |
| 5,535,430 | 7/1996 | Aoki et al. | 455/552 |
| 5,544,222 | 8/1996 | Robinson et al. | 455/557 |
| 5,729,694 | 3/1998 | Holzrichter et al. | 705/17 |
| 5,761,640 | 6/1998 | Kalyanswamy et al. | 704/260 |
| 5,845,250 | 12/1998 | Vogten | 704/270 |

OTHER PUBLICATIONS

Speech Synthesis Today and Tomorrow, Collier et al., Philips J. of Res., vol. 47, No. 1, 1992, pp. 15–33.

Low Bit Rate Cepstral Vocoder Using the Log Magnitude Approximation Filter, Satoshi Imai, Tokyo Institute of Technology, Research Laboratory of Precision Machinery and Electronics, Jun. 1978, pp. 441–444.

Electronic Synthesis of Speech, R. Linggard, Cambridge University Press, Jan. 1985, pp. 95–137.

Robust IBOC DAB AM and FM Technology for Digital audio Broadcasting, Kroeger et al., The Internet, http://www.usadr.com/tech_ibocdab.shtml, Feb. 3, 1998, 19 pages.

RBDS for Your Station, Bill Ammons, The Internet, http://www.cpiradio.com/rbds.htm, Feb. 3, 1998, 13 pages.

RDS/RBDS, Radio Data System, David Hemingway, The Internet, http://www.dungeon.com/~start/rdsdh.html, Feb. 3, 1998, 9 pages.

OnStar, The Internet, wysiwyg://12/http://www.onstar.com/experience/story/philosphy.html, Feb. 3, 1998, 3 pages.

RealNetworks—The Home of Streaming Media, The Internet, http://www.real.com/index.html, Sep. 8, 1998, 1 page.

L&H Prosody Transplantation Tool, data sheet, by Lernout & Hauspie Speech Products, Feb. 1996, 2 pages.

*Primary Examiner*—Richemond Dorvil
*Attorney, Agent, or Firm*—Kevin M. Jordan; F. Chau & Associates, LLP

[57] ABSTRACT

An information signal content authoring system is provided. The authoring system includes a speech analyzer, responsive to a spoken utterance signal provided by a narrator. The spoken utterance signal is representative of information available to the narrator. The speech analyzer generates a speech signal representative of one or more prosodic parameters associated with the narrator. A text-to-speech converter, responsive to a text signal representative of the information available to the narrator, generates a phonetic representation signal from the text signal and synthesizes a speech signal from the text signal. The text-to-speech converter also generates one or more prosodic parameters from the text signal. A spectrum comparator, operatively coupled to the speech analyzer and the text-to-speech converter, compares the spectral parameters of the speech signal generated by the speech analyzer to the speech signal synthesized by the converter and generates a variance signal indicative of a spectral distance between the two speech signals. The variance signal is provided to the text-to-speech converter to adjust the prosodic parameters. An output portion, operatively coupled to the text-to-speech converter, outputs the phonetic representation signal and the prosodic parameters from the converter as a composite encoded signal representative of information content available to the narrator. The output portion further preferably includes an editor, response to editing commands issued by the narrator, for editing at least a portion of the composite encoded signal.

12 Claims, 5 Drawing Sheets

TTS AND PROSODY BASED AUTHORING SYSTEM

BACKGROUND OF THE INVENTION

1. Field of the Invention

The present invention relates to systems and methods of generating phonetic and prosody based information signals from data provided by content providers and, more specifically, the present invention relates to an authoring system for creating and editing such signals. The authoring system is preferably applicable to an individualized and interactive radio and communications system and services, including interactively controlled creation, repository, and delivery of content by human quality voice via a digital wireless communication infrastructure, to a wireless network computer, either hand-held or mountable in vehicles.

2. Background of the Prior Art

There have been a number of various technology advances in the radio broadcast industry which expand the available bandwidth to mobile customers, add some interactive control functions, improve reception, and allow radio programming to incorporate alphanumeric data. Mobile radios started integrating additional subsystems, e.g., U.S. Global Positioning System (GPS) receivers to locate vehicle coordinates, LCD screens for displaying alphanumeric data, e.g., song lyrics, paging, or for displaying graphic information, such as a local map retrieved from a co-located CD-ROM.

However, the fundamental radio technology has changed very little ever since its conception. It is still based on the original idea of channeled broadcast, which offers very little customization to listeners. That is, listeners can merely choose among a few channels, limited by the scarcely available bandwidth.

There have been revolutionary changes in the information technology in the recent years, e.g.: (1) a large amount of information has become available due to the advent of the Internet and other similar repositories; and (2) a sufficient overall communications bandwidth has become available to mobile consumers due to the advent of wireless technologies, e.g., cellular telephony, satellite communications.

Currently, this vast amount of information is primarily tuned for visual presentations on computer screens. Similar to computer users, radio listeners have a constantly increasing need for the capability to choose what they want to listen to, and when they want to listen to it.

There have been conventional computer-based attempts to deliver audio presentation of information to computer users on demand. The traditional method to achieve the above employs audio compression techniques and is quite straightforward. The textual information is first read by a human, the human voice is captured in an audio file, the audio file is then compressed and stored in a network-based information repository for consumption. The playback device, hardwired to the same wired line network as the repository, retrieves the compressed audio files from the repository, decompresses them, and then plays them back.

Using such a scheme, Real Audio technology delivers AM quality audio (speech or music), if the client communicates with the Real Audio server at about 14 Kbps (kilobits per second), and provides FM quality audio when the available transmission rate is about or better than 28 Kbps. AM quality voice compression may be achieved at lower rates. Clearly, there is a trade-off between the compression ratio and the quality of the restored audio. Today, the maximum voice compression accepted by the wireless telephony industry is approximately 7–8 Kbps. For example, a compression scheme is used by digital cellular telephony standard IS-54 and is based on a vector-sum excited linear prediction (VSELP) coding technique which achieves 7.95 Kbps data rate.

However, this traditional radio on demand scheme assumes transmitting large volumes of digital audio data over long periods of time, i.e., on the order of hours. Using wired lines with its relatively cheap communications cost is economically acceptable for digital audio transmission. The customer is usually connected to the Internet or similar services by using a 14.4 Kbps or 28.8 Kbps modem over a single local telephone line. Therefore, even FM quality audio can be delivered to the customer very cheaply. The charge usually includes the cost of the local call (usually no additional charge is incurred to the basic phone connection cost) and a proportion of the charge paid to the Internet Service Provider (ISP). The latter also may be considered zero (no additional charge), if the ISP service charge is a flat rate.

Alternatively, even a contemporary system based on the widely used AMPS (Advanced Mobile Phone Service which is a wireless network used by analog cellular phones) modem still only reliably delivers about 4 Kbps to 8 Kbps depending on the speed of the vehicle, local geographic landscape and number of users simultaneously sharing the available local bandwidth.

Overall, the cost of wireless data transmission is usually about one or two orders of magnitude more expensive than in the case of wired data transmission. Clearly, such a method of transmitting compressed voice defeats the purpose of using wireless communication in the first place, because compressed speech takes at least as much data bandwidth as can be transmitted over a wireless telephony channel. In other words, the cost of digital voice transmission over AMPS is then approximately the same as transmission of an analog source without compression.

To allow users to share the cost of wireless data transmission, several companies have introduced the so-called Cellular Digital Packet Data (C.D.) technique. It allows multiple users to be connected to an IP (Internet Protocol) network permanently by sharing an idle AMPS channel and hopping between idle AMPS channels. An average data rate per CPD. user depends on the number of users sharing the channel. For example, if 20 users simultaneously send or receive data via one channel, individual average data rate will be just about 400 bps, which is sufficient for e-mail and other relatively short messages. The cost of transmission per byte is somewhat higher than using AMPS, but the packet approach to data transmission allows providers to charge users for the amount of data transmitted, not for the connection time. However, the above-described traditional scheme of compressed audio transmission requires much more bandwidth than is available to users connected to the audio source via CDPD network.

It is anticipated that in a few years, Personal Communication Systems (PCS) will have a somewhat better digital data transmission rate then AMPS and CDPD, but still will not be economical for long hours of wireless digital audio transmission.

It is clear from the above discussion that using traditional methods of transmitting large volumes of digital audio data to radio devices is prohibitively expensive, because the cost of the wireless communications media is optimized for relatively short transmissions, e.g., an average voice phone call or electronic mail. In the foreseeable future, known techniques will not yield the compression ratios necessary for economical transmission of audio data over wireless lines while providing an acceptable broadcast audio quality.

Today, the only known method to deliver large amounts of data wirelessly is using a speech synthesis method. Low bit rate may be obtained using Text-To-Speech (TTS) conversion technology. Regular text is represented by about 8 to 20 characters per second, or requires a maximum 160 bps transmission data rate; however, resulting speech does not deliver an acceptable human intonation.

Although arbitrary speech conversion is based on prosody rules as well as syntactic and morphological analysis, achieving human speaker's voice quality has not been feasible so far. One of the requirements of radio transmission is to deliver a speaker's intonation accurately, because the speaker prosody reflects certain aspects of his/her personality and the state of mind of the speaker. While speech compression delivers speaker's intonation precisely, arbitrary speech synthesis frequently does not.

Experiments show that such a "synthetic" intonation is not acceptable for the majority of radio listeners. As a result, the majority of radio listeners usually feel aggravated in a few minutes or loose their attention. This is the reason that TTS did not find a widespread usage yet, unless the message is short, and to the point, like e-mail or a stock market quote.

Despite the many drawbacks described above, as well as others not particularly mentioned, several radio communication service systems have been proposed. The following are examples of such conventional radio communications service systems.

U.S. Pat. No. 5,303,393 to Noreen et al. describes a so-called RadioSat system including key features of nationwide broadcast of FM channels and paging. While some RadioSat data communication services, like paging, could be implemented by using terrestrial communication, e.g. Personal Communication Systems (PCS), only satellite broadcast transmission provides a significant number of additional FM channels nationwide. Also, any substantial amount of data, like digital audio, may be transmitted to mobile RadioSat terminals via satellites only. Many critical interactive RadioSat applications, including two-way voice communication, require satellites to provide a return channel (mobile-to-satellite), which is not the case for many national satellite systems. Even in the United States, the necessary satellite infrastructure to provide full RadioSat services has yet to be built. Next, the user interface and information delivery is based on a touch screen approach, which is unsafe, because user attention has to be switched from the road to the terminal screen frequently either for receiving the information or for issuing commands. And last, but not least, the scope and spirit of Radio Sat services is essentially a radio broadcast. The RadioSat technology merely expands the number of available channels. Thus, each MSAT could support on the order of 166 FM-quality channels, or four times as many talk channels (AM quality). Individualized services to hundreds of thousands of mobile users cannot possibly be provided by the Noreen et al. system.

The USA Digital Radio foundation of U.S. broadcasters has developed a system for the delivery of in-band on-channel (IBOC) digital audio broadcasting (DAB) in order to introduce compact disc quality broadcast radio, while preserving the infrastructure and investment of the broadcast industry AM segment. Key to the realization of IBOC DAB in limited AM band allocations is a powerful source compression algorithm. The AM IBOC audio source encoding scheme is based on MUSICAM® which is in turn based on the ISO/MPEG I Audio Layer II (ISO 11172-3) standard for audio sub-band encoding. The standard has been advanced through the development of the psycho-acoustic model to the point where music may be transcoded at a rate of 96 Kbps in order to reproduce 16 bit stereo at a 15 KHz audio bandwidth. The resulting 96 Kbps bit stream includes, in addition to compressed music, a 2.4 Kbps ancillary data stream. The compression of music to 96 Kbps enables broadcasting of DAB over the narrow bandwidth available to the AM allocation.

AM offers DAB a readily available network of high quality audio broadcasting facilities and, as such, its data delivery capability can be used to transmit song titles, artists, and album names and lyrics, traffic and weather information, emergency warnings, paging services, stock market quotations, etc. However, IBOC DAB is essentially a broadcast technology which cannot be used for individualized and interactive data or audio transmission.

Still another approach called the Radio Broadcast Data System (RBDS) allows an FM station to transmit auxiliary data for the newer generation of "smart radios" now coming to the market. The RBDS standard was developed for the U.S. radio market and is an outgrowth of RDS that has been used in Europe for some time. The RBDS signal is transmitted by an FM station on a 57 kHz subcarrier as a bi-phase coded signal with an overall data rate of 1187.5 bps, including forward error correction. The usable data rate is 730 bps. The signal is made of 16 data groups. Each group delivers data for a different application. Thus, one group is used for Differential GPS data to increase an accuracy of GPS satellite-only based positioning. One other group is used for radio paging. Still other groups are used for station identification. Some other group lists alternate station frequencies to let a user keep tuned to the same program when reception is fading. Some groups are used for text transmission, like radio text group, which allows receiving 64 character messages, and radio paging group. This list is not complete and somewhat different for RDS and RDBS standards. American RDBS version reserves groups 3, 5, 6 and 7 for renting by station owners to service providers. For example, content providers may transmit newspapers and periodicals, promotional messages and advertising, artist's name and title of song.

Overall the useful data transmission rate for a single group is 45.6 bps. This data rate can be mostly used for scrawling text messages on an LCD screen, e.g., song lyrics. Moreover, it is known that the RDS standard creators admit that the Radio Text feature is unlikely to be used in car receivers, due to the distracting effect of a video screen to a driver.

The data transmission rates typical for the RDS/RDBS standards are obviously too slow for any audio-related application. Also, interactive applications are completely out of the scope of those standards. As a result, while RDBS or RDS standards substantially expand broadcast services, they still do not provide users with individualized and fully interactive audio content transmission.

Another approach is described in U.S. Pat. No. 5,321,514 to Martinez which proposes making practical use of presently unusable "taboo" frequencies for bi-directional data transfer between consumer digital receivers and television transmitters. The so-called "T-NET" system makes use of a spread spectrum approach to provide bi-directional digital communication on a vacant television channel. An aggregate upstream data rate may achieve about 3 Mbps at the service area radius of about 6 miles, so the T-NET system may provide about 10,000 users with an individual upstream data rate of about 300 bps per user and downstream data rate of about 200 bps per user. While this approach may provide an individualized and interactive data service, interactive audio services are still out of the range of such a system. In addition, using such frequencies may generate unacceptable interference for public television channels, and may not be allowed by the Federal Communication Commission (FCC), routinely and everywhere.

Bell Atlantic has offered a service which allows cellular telephone users to receive pre-recorded voice messages. Those messages may be local news, weather, stock market, traffic announcements and other information. The user requests information by first calling a special number and then punching telephone keys to browse through the menu offered by a pre-recorded voice. However, considering the high cost of a cellular call, such an information system is prohibitively expensive if used more than a few minutes per day. Also, the quality of speech delivered through the cellular phone is typically lower than AM voice quality.

General Motors Corporation introduced its OnStar system for the 1997 Cadillac model. By linking the car's cellular phone to a global positioning satellite, OnStar can locate and send help to a stranded or disabled motorist; including sending medical assistance as soon as it detects that the car's air bag has been deployed. OnStar's service center operator receives coordinates of an automobile equipped with the OnStar system and could navigate its user, over the cellular phone, with continuous directions.

SUMMARY OF THE INVENTION

It is an object of the present invention to provide systems and methods for enabling content providers with authoring tools to provide a highly compressed voice content.

In one aspect of the present invention, an information signal content authoring system comprises: speech analysis means, responsive to a spoken utterance signal provided by a narrator, the spoken utterance signal being representative of information available to the narrator, the speech analysis means generating a speech signal representative of at least one prosodic parameter associated with the narrator; text-to-speech conversion means, responsive to a text signal representative of the information available to the narrator, the conversion means generating a phonetic representation signal from the text signal and synthesizing a speech signal from the text signal, the text-to-speech conversion means also generating at least one prosodic parameter from the text signal; comparing means, operatively coupled to the speech analysis means and the conversion means, for comparing the at least one spectral parameter of the speech signal generated by the speech analysis means to the speech signal synthesized by the conversion means and generating a variance signal indicative of a spectral distance between the two speech signals, the variance signal being provided to the text-to-speech conversion means to adjust the at least one prosodic parameter; and output means, operatively coupled to the speech analysis means, the conversion means and the comparing means, for outputting the phonetic representation signal and the at least one prosodic parameter from the conversion means as a composite encoded signal representative of information content available to the narrator. The output portion preferably includes editing means, responsive to editing commands issued by the narrator, for editing at least a portion of the composite encoded signal.

These and other objects, features and advantages of the present invention will become apparent from the following detailed description of illustrative embodiments thereof, which is to be read in connection with the accompanying drawings in which the same reference numerals are used throughout the various figures to designate same or similar components.

DETAILED DESCRIPTION OF PREFERRED EMBODIMENTS

Figure 1:
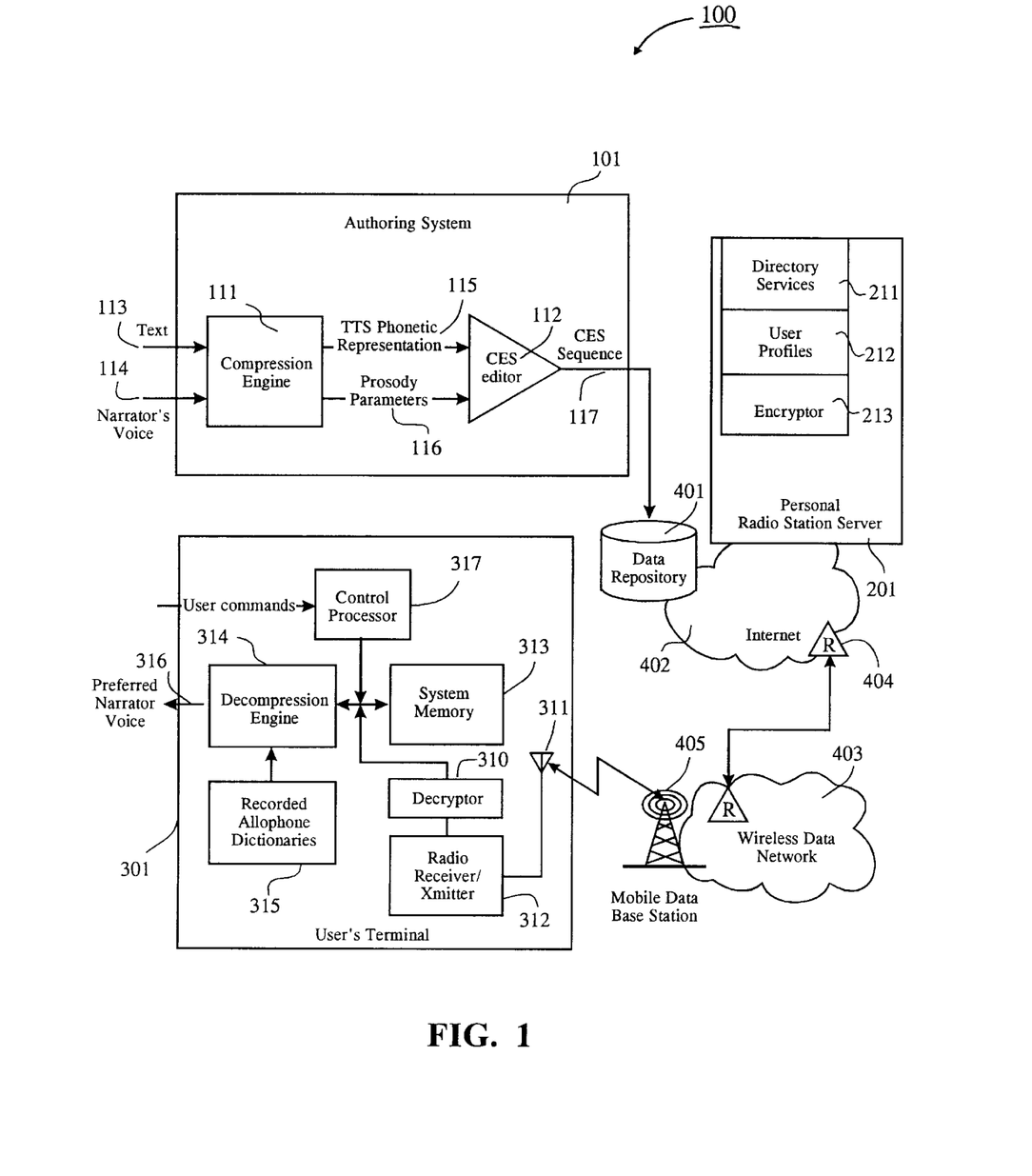
FIG. 1 is a block diagram of an embodiment of a singlecast interactive radio system according to the present invention.

Referring initially to FIG. 1, a general block diagram of a preferred embodiment of a singlecast interactive radio system 100 is shown. As will become evident, the term "singlecast" derives from the fact that the present invention provides a user with the ability to interactively receive a vast amount of information, as well as send information, across a single radio channel uniquely established between information content providers and system users. The system 100 includes three major components: an authoring system 101 for, inter alia, enabling content providers to produce a highly compressed voice content; a personal radio station server (PRSS) 201 for, inter alia, detecting user requests, assembling and sending audio data to a user; and a user terminal 301 for, inter alia, initiating transmission, decompressing audio data, and playing the audio data back to the user using one of several preloaded "voices". These and other functions of the system and its components will be described in detail below. Also, although only one user terminal 301 is shown, it is to be understood that such a system 100 contains a plurality of similar user terminals. Likewise, although only one authoring system 101 and one PRSS 201 are shown in FIG. 1, the system 100 may include more than one authoring system 101 and more than one PRSS 201.

It is to be appreciated that the singlecast interactive radio system 100 is preferably interconnected in the following manner. The authoring system 101 is operatively coupled to a data repository 401. The data repository 401 may preferably be a data network server which is part of an existing wide area data communications network 402, e.g., a World Wide Web server on the Internet. Again, while only one data repository 401 is shown in FIG. 1, there is conceivably no limit to the number of such repositories. The PRSS 201 is operatively coupled to the same network 402 as the data repository 401. Further, the data network 402 is operatively coupled to a wireless data communications network 403 via respective conventional data routers 404. The link between the routers 404 may be wired and/or wireless. The wireless data communications network 403, which is preferably an existing network (e.g., AMPS, GSM, PCS), is in operative communication with the plurality of user terminals 301 via a base station 405. While not expressly shown, a plurality of similar base stations may be employed to provide two-way data and voice communications between users and the service providers.

In general, the singlecast interactive radio system 100 delivers digitized audio-based content to subscribers upon their request, economically and with human voice qualities. As mentioned, the system preferably includes one or more personal radio station servers (PRSSs) 201, a plurality of user terminals 301, and content authoring tools offered by the authoring system 101. The system 100 also preferably exploits one of the existing wireless data communication networks as a transmission medium. The content authoring tools enable content creators (e.g., news service providers) to produce a highly compressed voice-based information content, to be further stored on data network (e.g., Internet) servers, such as the data repository 401. The PRSS 201 stores multiple subscribers' profiles with topics of individual interest, assembles content material from various Web sites according to the topics, and transmits the content to a subscriber's user terminal 301, on the subscriber's request, over the wireless data network 403. The user terminal 301 restores voice-based material with AM-radio voice quality or better. Advantageously, transmission costs of such material is very low in comparison to existing methods of voice communication, at least as a result of chosen compression algorithms.

The user terminal 301 is a computer-based terminal which preferably integrates, electrically and mechanically, a conventional radio with cellular phone equipment. The user terminal is preferably mobile; however, the user terminal can alternatively be a fixed position terminal, e.g., fixed in a vehicle or at a stationary site. Further, a user can control system functions hands-free by issuing voice commands only. Such functions include, but are not limited to, cellular telephony voice dialing and control, secure network log-on based on voice identification, hands-free tuning to conventional radio stations, changing audio playback level, and switching between functions. Such hands-free feature provides not only ease of use but also increases safety in use, particularly when the user terminal is operated by a user while the user is operating a motor vehicle. Still further, each user terminal 301 retrieves text material from the Internet or other data depositories, plays the material back as a computer-generated speech, digitizes a voice response from the user, and delivers it to other e-mail addresses over related networks, including wired networks.

Furthermore, the authoring system 101 of the singlecast interactive radio system 100 generally includes speech compression means based on text-to-speech (TTS) with transplanted prosody. It is to be appreciated that the effective speech data rate depends on what TTS conversion technique is adopted, precision of coding, average number of phonemes per second for a specific language, and other parameters. For example, U.S. Pat. No. 4,912,768 to Benbassat, the disclosure of which is incorporated herein by reference, discusses that the maximum data rate for phonetic or allophone representation of speech with transplanted prosody parameters is believed to be below 400 bps and may even reach 120 bps. Another TTS system with prosody transplantation, which is implemented by Lernout and Hauspie Speech Products of Belgium, has a data rate of about 300 bps. However, these and other TTS techniques may be employed in the singlecast interactive radio system of the present invention.

Nonetheless, such a data rate provided by the high degree of TTS compression leads to a major breakthrough in the cost of wireless data communications. The following assumptions apply in relation to the preferred system shown in FIG. 1; however, it is to be understood that the present invention is not limited to these assumptions which are provided merely to illustrate certain features of a preferred embodiment: (1) a maximum data rate of composite encoded speech (CES) is about 400 bps; (2) a communication data rate over AMPS analog cellular channel is about 8 kbps; and (3) about 20 users share CDPD channel simultaneously; hence, the integrated data rate drops from about 19.2 kbps to about 8 kbps, due to users' contention.

Delivering data over a wireless data network such as AMPS analog cellular network with about 8 kbps data rate is about 20 times faster than the playback time of any stored data.

Therefore, if the cost of a local call is about 30 cents per minute, the cost of a singlecast radio transmission attributed to the present invention is about 1.5 cents per minute. For example, 1 hour of service costs the customer only about 90 cents, which is competitive with the current price that Internet Service Providers (ISP) charge today for wired connection to the Internet.

Delivering speech over CDPD network serves about 20 users with the data rate of about 400 bps. CDPD customers are charged per byte of delivered information, hence, the charges per user also drop proportionally. While CDPD charges vary between providers, potentially the cost to the customer should be equal or better than the cost of using AMPS for the transmission of equal data volume.

In addition, the singlecast radio system of the invention practically multiplies the number of users who can use the existing wireless network for voice delivery, without expanding the infrastructure of the existing wireless network. Analog cellular systems of the 1990s employ 60 degree sectorial antennas, where each sector may serve about 30 channels. The extra capacity of about 1.5 channels, or about 5% is sufficient to serve an additional 30 users of the singlecast radio system of the present invention in each direction of the antenna. Usually, the network is engineered for extra capacity to easily cover such an increase.

As a result, the present invention advantageously provides a system which is capable of delivering large amounts of information to radio listeners wirelessly with a price comparable to wired communications and a voice quality comparable to conventional radio.

It is to be appreciated that the following discussion, with regard to FIG. 1, will provide an overall functional explanation of the system 100, while the discussions following thereafter with regard to the remaining figures, will provide further details of the three main components of the system 100, namely, the authoring system, the PRSS and the user terminal.

FIG. 1 illustrates that a narrator's voice and the text being read by a narrator are fed to the authoring system 101. Particularly, the voice and text is presented to a compression engine 111 where the voice and text are converted to two interdependent data streams. It is to be understood that the narrator may be a person employed by an information/news service provider and who is reading a textual representation of the particular data, e.g., information or news, that the end user has subscribed to and/or desires. The first stream is a string of phonemes 115, produced from the text 113 by a TTS system (e.g., such as will be explained or such as the Benbassat TTS system or the Lernout and Hauspie TTS system) provided as part of the compression engine 111. The second data stream 116 represents at least one physical or prosodic variance parameter of the narrator's speech, such as pitch, frequency, amplitude and duration. The prosodic variance data is derived from a spectral comparison of the synthetic voice produced by the TTS-based speech synthesizer and a narrator-spoken version of the particular data, performed in the compression engine 111. The result of the spectral comparison is used to adjust the TTS phonetic representation of the data through corrective feedback, as will be explained. The resulting adjusted TTS phonetically encoded data with prosody parameters forms a composite encoded speech (CES) sequence 117 which is provided to CES editor 112. The narrator may view the CES stream and correct any of its parameters by using the CES editor 112. An example of an editor for editing the CES sequence is described in the article by Collier et al., entitled: "Speech Synthesis Today and Tomorrow", Philips J. Rev. 47, pp. 15–34 (1992). More specific details of the authoring system 101 and CES encoded sequence will be described below in the context of FIGS. 2A and 2B.

The encoded speech file is then stored in the data repository 401 as a data file with a predetermined structure, e.g., as an HTML document. An unlimited collection of such documents may be created and stored by content providers. It is to be appreciated that the various types of information and data that can be created by the authoring system are conceivably unlimited. One of ordinary skill in the related art will appreciate many applications for employing the authoring system of the invention given the teachings herein.

Next, users request CES-based documents by placing a call from their user terminal 301 to a PRSS 201. The PRSS maintains user profiles 212, as will be explained, which include individual lists of topics of interest. There are preferably two distinct methods of information retrieval via the PRSS directory services. It is to be appreciated that the phrase "directory services" refers to the mechanism employed to locate users and entries about users via the PRSS (i.e., similar to a telephone company's so-called "white pages"). There are several known directory service arrangements that are used in server-based environments. One method is based on assembling the information on all the topics of interests. Every individual subscriber may establish such a profile during a first set-up communications session and may modify the list during subsequent sessions. When a subsequent session is initiated, the user will receive all information listed in the user's list of topics, but only that information pertaining to the user selected topics of interest. Practicing the second method, a user may browse among all CES documents, according to temporary established search criteria. A combination of methods can also be used. For example, a user can request additional information on the registered topic of interest, and therefore initialize a browsing process. The above-described methods of searching and browsing via the PRSS may be implemented by schemes similar to the conventional methods of searching and browsing the Internet. For example, it is known that "push technology" permits a user to create a profile and to receive information on topics identified in his profile via the previously established search criteria. However, it is also known that an Internet user may search or browse the Internet via temporary search criteria, e.g., a user enters a particular search term (e.g., "weather") during an on-line session. The PRSS supports such search and browsing methods for automatically and manually obtaining CES-based files for playback on his user terminal.

The PRSS 201 also preferably includes an encryptor 213 for providing encryption of the CES-based files. In this manner, only registered users may listen to the CES-based files with a user terminal 301 having appropriate decryption capability (i.e., decryptor 310 in FIG. 1). Any conventional cryptographic scheme may be employed.

In addition, the PRSS preferably includes a system cache, as will be explained, which allows for pre-fetching of information as it becomes available, and then delivering the information to the user terminal upon log-on in a quick burst, which can be a short fraction of the playback time. Such an approach makes wireless delivery very efficient since the transmission time is short, and the likelihood of encountering dead spots and fade-outs is small. More specific details of the PRSS 201 will be described below in the context of FIG. 3.

The user initiates a communications session by issuing a log-on command to a control processor 317 in the user's terminal 301. The user commands can be either voice commands, which is the most appropriate method for terminals installed in a vehicle, or the user may press appropriate control keys (not shown) on the user terminal. The processor 317 of the user terminal sends the log-on request to the PRSS 201 via a radio receiver/transmitter 312 through the wireless data network 403. The request data packet is consequently registered by the closest mobile data base station 405, and routed over the wireless data network 403, e.g., AMPS, GSM, PCS, and the wired communications network 402, e.g., Internet, to the PRSS 201. The PRSS 201 determines a user's network address which is part of the request data package, implements a user authentication and authorization process, and forwards appropriate CES-based files to the user's terminal 301 via the wired network 402 and the wireless network 403.

The particular authentication and authorization process employed is not critical to the invention and, as a result, any suitable process may be implemented. For example, the user terminal may be adapted to accept a smartcard containing user specific information (e.g., username, user ID, user password, etc.) which is read by the terminal and then transmitted to the PRSS 201 as explained above. Further, by way of example, user ID information may be permanently coded into each transmission signal by providing each user terminal with its own unique terminal ID number, stored in system memory, which is automatically appended to the transmission signal. Still further, by way of example, voice recognition may be employed whereby the user utters a password which is decoded at the PRSS and compared to a previously stored acoustic sample of the user's spoken utterances. Of course, these authentication and authorization approaches are merely examples and the invention is not limited thereto.

The user terminal 301 receives the CES file(s) via the antenna 311 and the radio receiver/transmitter 312 and decrypts the encrypted CES file(s) via decryptor 310. Then, the user terminal 301 stores the received CES file(s) into a system memory 313. A decompression engine 314, operatively coupled to the control processor 317 and the system memory 313, synthesizes the voice, using one or more recorded allophone dictionaries 315 which may be individually selected by the user. It is to be appreciated that allophones are variants of phonemes based on surrounding speech sounds. While allophones are preferably employed in the text-to-speech synthesis, any other form of syllables or phonetic units may be used. Several such dictionaries may be preloaded into a read-only memory (not shown) of the user's terminal. The dictionaries 315 is used in the process of voice synthesis. That is, the allophones recorded in the dictionaries respectively define the preferred narrator voices 316, one of which may be chosen by the user. In other words, the user may preselect, via a voice-command, the type of "voice" he wishes to have narrate the requested decompressed information and, depending on his selection, the appropriate allophone dictionary is used to speech synthesize the information. By issuing corresponding commands, preferably verbally, to the control processor 317, the user not only can choose among several of the dictionaries to be used interchangeably, but also can control the playback rate, level, repeat, fast forward, skip to the next file, and any other similar playback related functions, as will be further explained.

As an additional feature, music compressed as a MIDI (Musical Instrument Digital Interface) file and stored in the data repository accessed by the PRSS can also be mixed with the CES data, and then decompressed and played back by the user's terminal 301. Also, the user's terminal 301 may receive a regularly broadcast signal (e.g., a publicly broadcast music station) and use it as an audio background, while interactive audio data is being played back. More specific details of the user terminal 301 will be described below in the context of FIG. 4.

Figure 2A:
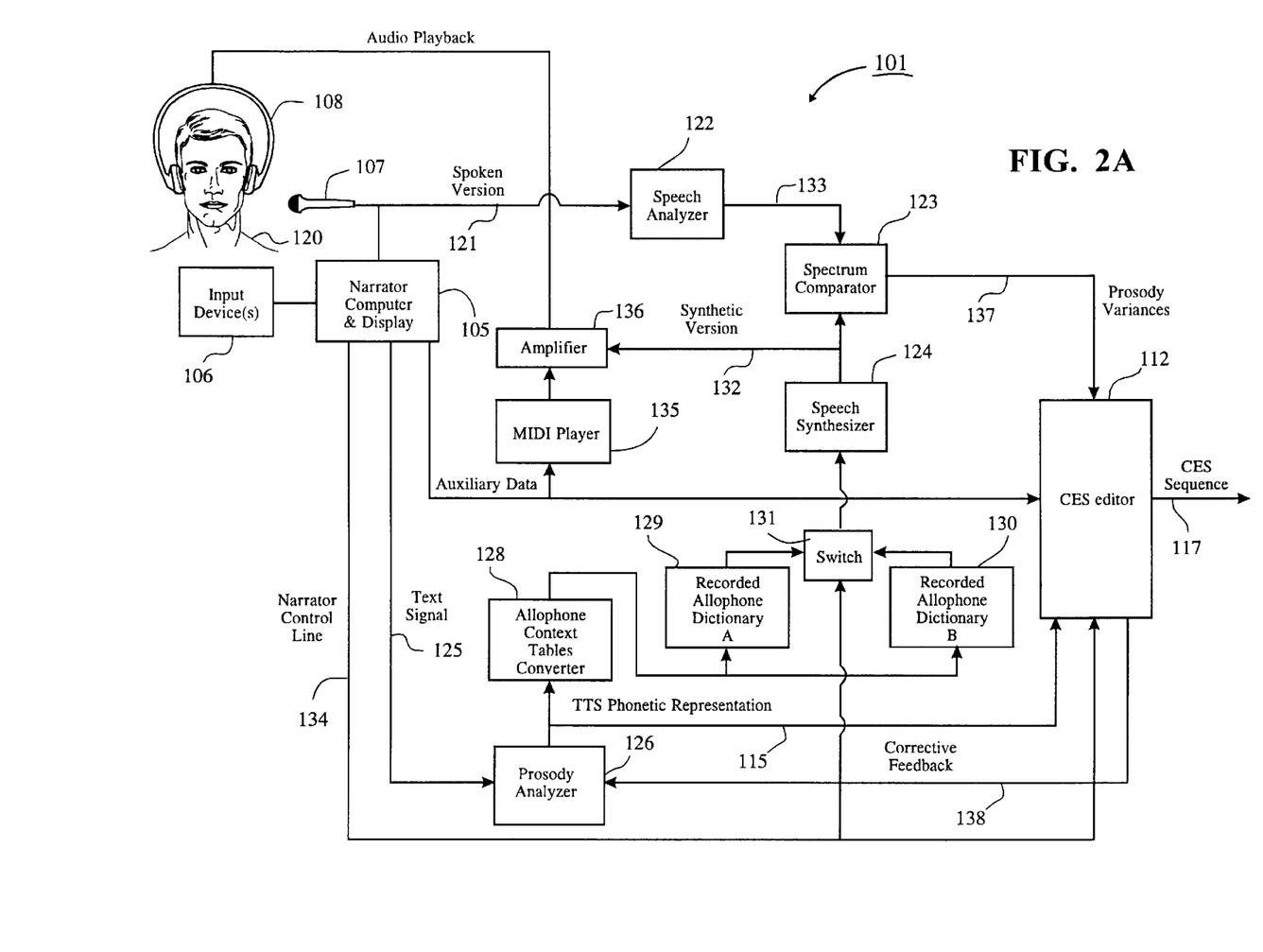
FIG. 2A is a block diagram of an embodiment of an authoring system according to the present invention.
Figure 2B:
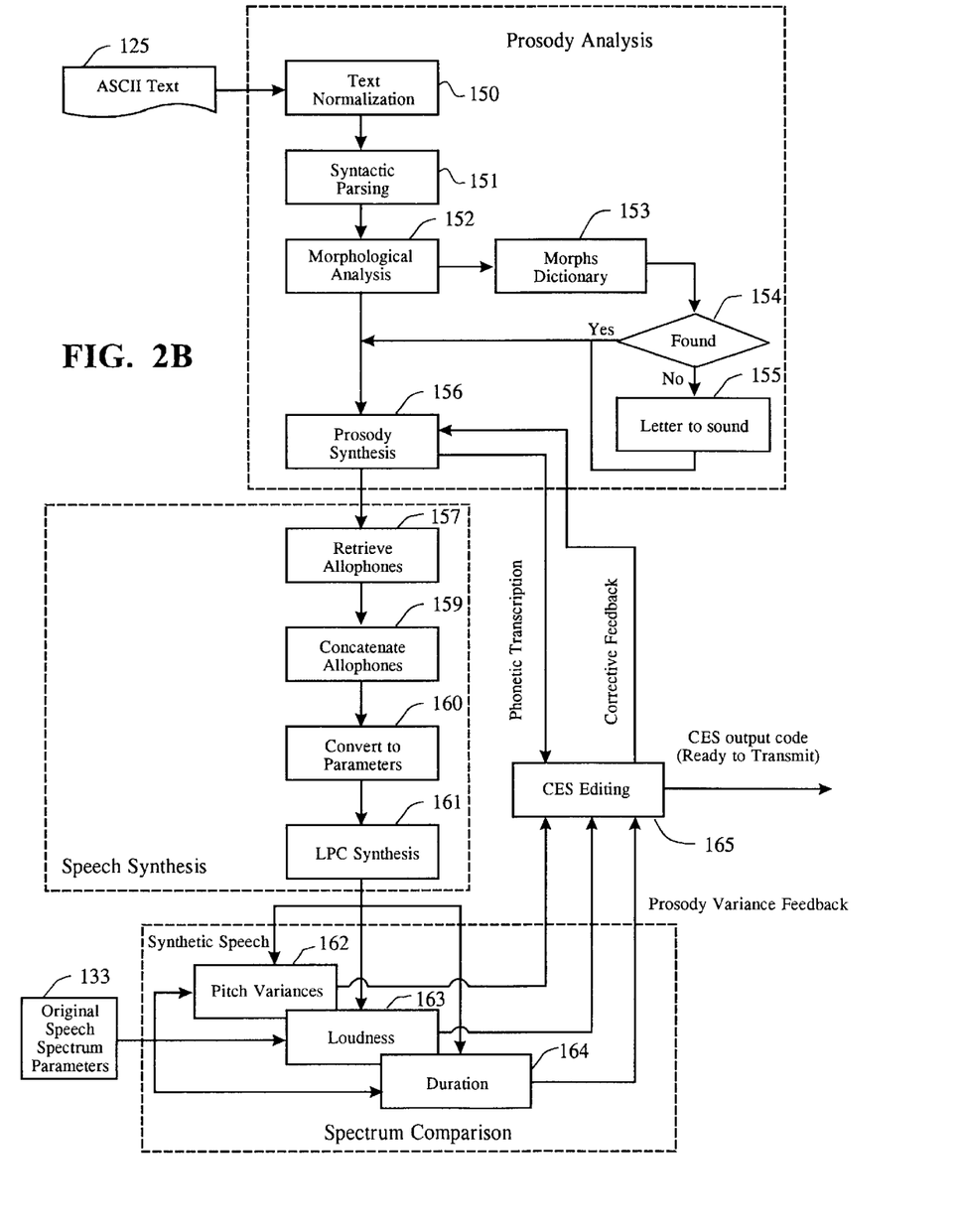
FIG. 2B is a flow chart of processes associated with the embodiment of the authoring system of FIG. 2A.

Referring now to FIGS. 2A and 2B, a block diagram and related flow chart of a preferred embodiment of a TTS and prosody based authoring system 101 are respectively shown. It to be understood that the transformation of text to speech is being done in two ways: with and without operator assistance. In some niche applications, such as a voice mail applications, or Dow Jones News Briefs, existing text-to-speech (TTS) systems, such as PROSE, DEC, Infovox, and AT&T Network Systems and Conversant Systems provide conversion of unconstrained text to speech. Such a synthetic speech is highly intelligible, but can be marred by an occasional mispronunciations, specific "machine accent", and is best-rendered in male voices and neutral accents. The singlecast interactive radio system of the invention exploits plain TTS systems for vertical applications, e.g., electronic mail (e-mail), where original speech is not available. Note that in this case, software filters need to be provided, which eliminate unnecessary information (e.g., list of gateways through which the message was delivered, or greetings), prioritizes the text, extracts name, subject and essence. "Essence" refers to the actual substantive body of the e-mail message.

However, for many applications, e.g., advertising, news services, electronic books, educational material etc., a lack of emotional content and monotonic production may antagonize the potential user. The user may misunderstand the message, or lose the level of attentiveness required to comprehend the message.

The singlecast interactive radio system of the invention offers a human-authored TTS system, which makes the quality of text-to-speech conversion substantially closer to live radio broadcast quality. The system permits varying and intermixing gender, age, and accent features of the playback voice. It also makes the speech delivery very close to the original speaker prosody. Similar voice quality may be obtained by transmitting sampled audio, but as explained above, the bandwidth required for transmission of sampled and even highly compressed audio is too large for present cellular wireless communication technology.

The authoring system of the invention corrects the intonation and adds emotional content to the audio delivery. The authoring system embodies a speech processing system which compares audio produced by an operator (narrator), who reads the text aloud, with the speech synthesized artificially from the same text. The comparison results are used to improve a phonetic representation of the text. Subsequently, prosodic information is sent along with the phonetic representation of the text data to the customer terminal, where it serves to add the required "humanity" to the resulting audio output.

Humans improve comprehension of speech by adding "prosody" to individual phonemes. The term "prosody" refers to varying pitch, loudness and duration of the basic sounds of the voice. Prosody can be also characterized as consisting of two parts: "intonation" which is characterized by pitch variations, and "rhythm", which is a function of variations of sounds in duration and amplitude. Hence, if prosody variables are extracted from the natural speech and transmitted together with a phonetic representation of text, the speech synthesis system produces the speech with intonation and rhythm very close to the original speech.

Therefore, one purpose of the authoring system is to generate prosody parameters, based on individual speech, and then use them during the speech synthesis at the user terminal. The authoring system generally includes three processes. First, the authoring system produces prosodic features according to the linguistic structure of the message, and uses them to create a synthetic speech. Second, the authoring system compares the synthetic speech with the actually spoken (natural) speech, determining corrective feedback to the prosodic variables. Third, the authoring system produces a final combination of the prosodic features with phonemes derived from the original text in a sequence ready to be stored, transmitted and then synthesized by user terminal.

Referring first to FIG. 2A, a narrator 120 delivers the spoken version of a message 121 (e.g., news) to the authoring system 101. The speech is converted by a microphone 107 to an electrical signal which is digitized and analyzed by a speech analyzer 122. The speech analyzer 122 provides speech spectrum parameters 133 of the speech using a conventional Fourier transform or a linear predictive analysis method. Preferably, the output speech signal of the speech analyzer 122 delivers information such as pitch contour, duration, and loudness with respect to the narrator's speech. Any type of pitch contour pattern could be generated, for example, a pitch contour pattern as described in the Collier et al. article.

The precise text version 125 of the message is converted to phonemes by a prosody analyzer 126 to form a text-to-speech (TTS) phonetic representation (phonemes) of the message. Prosodic parameters are also generated via the prosody analyzer 126. These parameters are adjusted during corrective feedback, as will be explained. It is to be understood that the text version of the message can be provided in any number of ways. As shown, for example, the text version of the message is read directly from the narrator's computer 105 as a standard text file. It is to be appreciated that the narrator's computer may be a standard stand-alone personal computer or workstation or, alternatively, the narrator's computer may be integrated with any computer(s) employed to perform other functions or features of the authoring system.

Next, allophone context tables converter 128 converts output data (phonemes) of the prosody analyzer 126 to allophones according to known techniques. Such known conversion techniques may include, for example, the text to speech conversion system for converting specified text strings into corresponding strings of consonant and vowel phonemes using context dependent allophones as described in U.S. Pat. No. 4,979,216 to Malsheen et al., the disclosure of which is incorporated herein by reference. The allophone context tables converter 128 then provides reference to several recorded allophone dictionaries 129 and 130 (i.e., dictionaries A and B), wherein previously recorded allophones are selected by matching said allophones with the allophones output by the allophone context table converter 128. The pre-recorded allophones are output to a speech synthesizer 124 by the dictionary store selected by the narrator, as will be explained. Depending on the type of speech synthesis, the allophones may have to be converted to some parametric format prior to submission to the synthesizer. This case is shown in FIG. 2B.

During an authoring system start-up procedure, the narrator issues a switch control signal that is provided on the narrator control line 134. The switch control signal controls a switch 131. The switch control signal is generated by the narrator's computer 105 in response to the narrator's input command received by an input device 106 (e.g., keyboard, mouse, etc.) operatively coupled to the computer 105. The narrator may have an option menu displayed on his computer display for selecting among the various options available to him (e.g., selection of allophone dictionary) and described herein.

The switch 131 determines which recorded allophone dictionary A (129) or B (130) is output to the speech synthesizer 124. Like the user who may select a preferred "voice" to narrate a requested message at his user terminal, the narrator 120 may select a "voice" with which the narrator will listen to the synthesized speech through a headset 105. In most cases, the dictionary (e.g., dictionary A) is chosen based on the pre-recorded voice (recorded allophones) of the current narrator. However, if the narrator would like to use a different dictionary (e.g., dictionary B), the resulting synthesized voice would be different from the narrator's voice, but will have the narrator's prosody features, e.g., such as in the case of an impersonation. For example, a male narrator may want to use a female voice for speech production. Thus, the switch control signal, provided over the narrator control line 134, is indicative of the narrator's desire to use one allophone dictionary rather than another and the switch, responsive to the control signal, selectively connects the desired dictionary with the speech synthesizer 124.

The speech synthesizer 124 generates a synthetic version of the signal output by the selected allophone dictionary (129 or 130). Any known form of speech coder/decoder (codec) may be employed to perform the functions of the speech synthesizer 124. The synthetic version of the message (synthetic speech signal) is then provided to a converter/amplifier 136, which converts the synthetic version of the speech to analog form and plays it back to the narrator 120 via the headset 108. In addition, the synthetic version of the message output by the speech synthesizer 124 is provided to a spectrum comparator 123. The spectrum comparator 123 compares the spectrum parameters of the "spoken" version of the speech 133 output by the speech analyzer 122 with the "synthetic" version of message output by the speech synthesizer 124 and calculates a spectral distance between time frames of "spoken" and "synthetic" versions. As a result, a prosody variance signal 137 is calculated and provided to the CES editor 112. The prosody variance signal 137 represents distance measures between the prosodic parameters extracted by analyzer 122 and those associated with the synthesized speech, e.g., pitch, loudness, duration.

Along with the prosody variances 137 from the spectrum comparator 123, the phonemes (TTS phonetic representation) from the prosody analyzer 126 serve as inputs to the CES editor 112. The CES editor 112 formats all of these data signals into a CES signal 117. Also, the narrator control line 134 is also operatively coupled to the editor 112 to provide the narrator with the capability to issue commands and thereby edit the CES sequence as desired. If the CES editor is implemented on the narrator's computer 105, his computer display screen provides the necessary editing environment. It is to be appreciated that the CES signal may be in a form similar to the enriched phonetic transcription described in the Collier et al. article. However, the exact format of the signal is not critical to the invention, rather, the content of the signal is important. (TTS phonetic representation and prosody parameters). As mentioned, the CES data 117 is then stored in one or more data repositories 401 (FIG. 1).

The prosody variance signal is provided to the CES editor 112 so that the narrator may view and edit the information, if he so desires. However, the prosody variance signal is subsequently provided to the prosody analyzer 126 as a corrective feedback signal. The prosody analyzer 126 uses this information to adjust the phonetic representation to be more accurate. The synthesis and comparison processes are then performed again to produce a phonetic sequence including prosody parameters which more closely represent the spoken version of the information provided by the narrator. This corrective feedback process can be iteratively repeated until either the narrator is content with the accuracy or a predetermined threshold measure of accuracy is met.

Furthermore, auxiliary data, e.g., MIDI data, can be also included in the CES transcription 117. The source of this data may be varied; however, as shown, the data is stored and read from the narrator's computer 105 as a standard MIDI file. MIDI data can also be converted to audio by a MIDI player 135 and played back as a musical background to the "synthetic" speech version fed back to the narrator through his headset 108. The music may also be played back to the narrator synchronous with, or independent of, the "synthetic" speech version.

As mentioned, the narrator 120 can edit the CES data 117 by issuing control commands over line 134 (e.g., in a similar manner as the control signal for controlling the switch 131 is issued) to the CES editor 117. Editing features may include, but are not limited to, stressing, speeding-up or slowing down specific words or sentences, adding sentences produced by other narrators, preparing a dialog of several voices.

The type of information that may be provided to the narrator at his computer terminal (user interface) relating to the phonetic representation and prosodic parameters of the data to be stored is conceivably unlimited. That is, the speech analyzer 122 and the prosody analyzer 126 may extract various other types of information from the data and provide it to the CES editor 112. One of ordinary skill in the art will appreciate such various types of information. By way of example, the previously-mentioned Collier et al. article discloses an example of types of information extracted from analyzed speech. The information is provided in a grid format and provides such information as: the scope and type of the sentence, the scope of the intonation phrase, the parts of speech of each word, the accent in the sentence, the morphological structure of each word, the syllable structure and stress pattern of each word, the phonemes, their segmental durations in milliseconds, and the relevant pitch movement parameters.

The CES editor of the invention provides the narrator with many capabilities to edit the information provided thereto. The editor permits the narrator to inspect the information (e.g., grid) in order to see the results of the prosodic analysis process and the spectrum comparison process. That is, the narrator may insert, delete, or modify certain input elements of the information and even provide his own input elements regardless of whether or not he is satisfied with the results generated by the system. The editor preferably provides the narrator with these, as well as other capabilities discussed herein, by employing a graphics-oriented tool to control the editing features, although editing may be implemented with type-in commands. One of ordinary skill in the art will appreciate other capabilities and features which the editor can provide, such, for example, as may be discussed in the Collier et al. article. It is to be appreciated that the components shown in FIG. 2A, with the exception of the CES editor, generally form the compression engine 111 shown in FIG. 1.

Referring now to FIG. 2B, a flow chart detailing specific processes performed by certain of the components of the authoring system 101 in FIG. 2A are shown. An incoming text signal 125 represented by ASCII codes is fed to a prosody analysis section (i.e., performed by prosody analyzer 126 in FIG. 2A). The text is normalized (block 150) to expand common abbreviations, number sequences, acronyms, etc. Expansion is based on specific classes of information, such as financial, electronic, stock market, etc., however, it can be corrected later in the process, based on the original speech source.

The text is then syntactically parsed (block 151) in order to identify parts of speech for each word so that different words with the same spelling may be properly pronounced. The parsing step also defines grammatical structures for obtaining the phrase focus which is necessary for assigning a preliminary intonation pattern. A semantic analysis is also performed during parsing to establish the phrasal hierarchy of the text, since a certain amount of text understanding is required for parsing text correctly.

Next, a morphological analysis (block 152) of words is done, using the morphs (word roots) dictionary 153 in conjunction with any conventional affix-stripping algorithm. The morphs pronunciation is stored in the morphs dictionary, and based on the root, prefix and suffix analysis, the overall word pronunciation is defined ("Yes" at block 154). It is to be appreciated that the morphs may be stored in the basic dictionary and several additional dictionaries, covering foreign languages, common names and application-specific exceptions. If the affix-stripping algorithm fails, i.e., word or abbreviation is not covered in the dictionary, and the reduced-to-morph word is not listed ("No" at block 154), letter-to-sound rules are applied to "guess" its pronunciation and stress assignment (block 155).

Next, a prosodic synthesis step (block 156) uses prosody rules to quantify relationships among sentences and ideas in a paragraph. This type of analysis aids in assigning prosodic features to words and phrases, as well as clarifying the ideas within a broad content. This step identifies places where pauses should be inserted, and places where emphases should be inserted or removed. This step is also where the corrective feedback from the CES editor is implemented. That is, the prosodic variance information is used to improve the accuracy of the phonetic representation of the text message.

At this point, the process of text-to-speech conversion generates a sequence of phonetic and prosodic symbols, representing phonemes, prosodic and syllabic information. This phonetic transcription is considered ready for transmission to the client, as in a general case of arbitrary text-to-speech generation. However, to make the speech sound more natural, the phonetic transcription undergoes a speech personalizing process.

The personalization process starts with generation of speech by a speech synthesis process (in accordance with the speech synthesizer 124, allophone context tables converter 128, and the dictionaries 129 and 130 in FIG. 2A). The building blocks of the speech synthesis process are stored in pre-recorded allophone dictionaries (dictionaries 129 and 130). Each dictionary generally holds an exhaustive set (about 10,000 for English) of parametrically analyzed versions of syllable units (e.g., allophones), produced by a single human subject. As mentioned with respect to FIG. 2A, the allophones from the converter 128 are used to retrieve the corresponding allophones form the dictionary (step 157). The selected allophones are then concatenated, i.e., combined (step 159). Since Linear Predictive Coding (LPC) is preferably employed, the allophones must be converted to predictor parametric coefficients (step 160), as is known. Then, LPC synthesis is performed (step 161). Other methods, for example, Multipulse-Excited Linear Prediction (MPLP) or Code Excited Linear Prediction (CELP) can be used instead of LPC. Nonetheless, the parametric representations are normalized in respect to their prosodic content, to facilitate subsequent manipulation. The output of the LPC synthesis step represents synthetic speech. An example of a similar conventional process for speech synthesis is described in R. Linggard, "Electronic Synthesis of Speech", pg. 97–105, Cambridge University Press (1985).

Further, the spectrum comparison process (i.e., performed by the spectrum comparator 123 in FIG. 2A) serves to analyze the spectrum and timing parameters of both synthetic speech, as well as the original narrator-provided speech (i.e., from speech analyzer 122 in FIG. 2A). The spectrum comparison process preferably compares stress variances in pitch pattern (block 162), loudness (block 163) and duration (block 164) of sounds and pauses. Although the speaker may be different from the allophone dictionary contributor, the variance data can be measured and then used to correct the prosody information generated by the prosody synthesis process (block 156), as explained above. The variance data can also be used to synchronize the process of speech synthesizing by the speech synthesizer 124.

After several iterations by corrective feedback between the spectrum comparison process and the prosody synthesis process, whereby the original speech and synthesized speech errors are minimized, the composite encoded sequence editor (CES editor 112 in FIG. 2A) receives the prosodically adjusted phonetic transcription data (block 165). As mentioned, the CES editing process (block 165) employs a graphic or text editor which assembles all the analysis data in a convenient form for representing it to the narrator or an operator on a terminal screen (narrator display 105 in FIG. 2A). The data may be provided to the narrator in any form and such format is not critical to the invention. One exemplary way may be for the data to be shown as a templet, e.g., a grid, consisting of a sentence, accompanied by prosody parameters. Also, as previously mentioned, an example of a grid may be found in the Collier et al. article. A trained operator (or narrator) may correct (retype) some or all of the parameters, if he is not completely satisfied with the results of automatic extraction of the prosody variables. The operator or narrator may make this determination, i.e., his satisfaction with the prosody parameters, during play back in his headset 108. A second function of the CES editing process is to form and mix phonemes, stress, duration and pitch parameters into a stream of data according to a preestablished data structure, which then can be understood by the speech synthesizer of the user terminal 301. The actual format of the information contained in the CES sequence is not critical to the invention, rather, it is the type of information which is important. A third function of the CES editing process is to provide the narrator with the ability to edit the prosody variance data to be presented as a corrective feedback to the prosody synthesizer (block 156). Again, the format of the data is not critical to the invention.

As a result of this unique speech authoring process, the speech signal output at the user terminal sounds like the speech produced by the human being on whom the allophone dictionary was based. It is to be understood that additional allophone dictionaries (129, 130, etc.) are produced, so that the system can produce speech in several different voices for playback to the narrator.

It is to be understood that the processes illustrated by the flowchart of FIG. 2B are preferably performed on the host computer or workstation by corresponding software modules. The computer or workstation for implementing the software code may have one or more processors (CPUs) with associated memory (e.g., RAM, ROM, mass storage operatively coupled to the processor via a computer bus) for storing, loading and running the software modules in a conventional manner. However, the speech analyzer 122 functions and spectrum comparator 123 functions may be more conveniently implemented by conventional dedicated hardware (e.g., one or more digital signal processors (DSPs)) operatively coupled to the computer or workstation processor which runs the other functional software-based processes.

Figure 4:
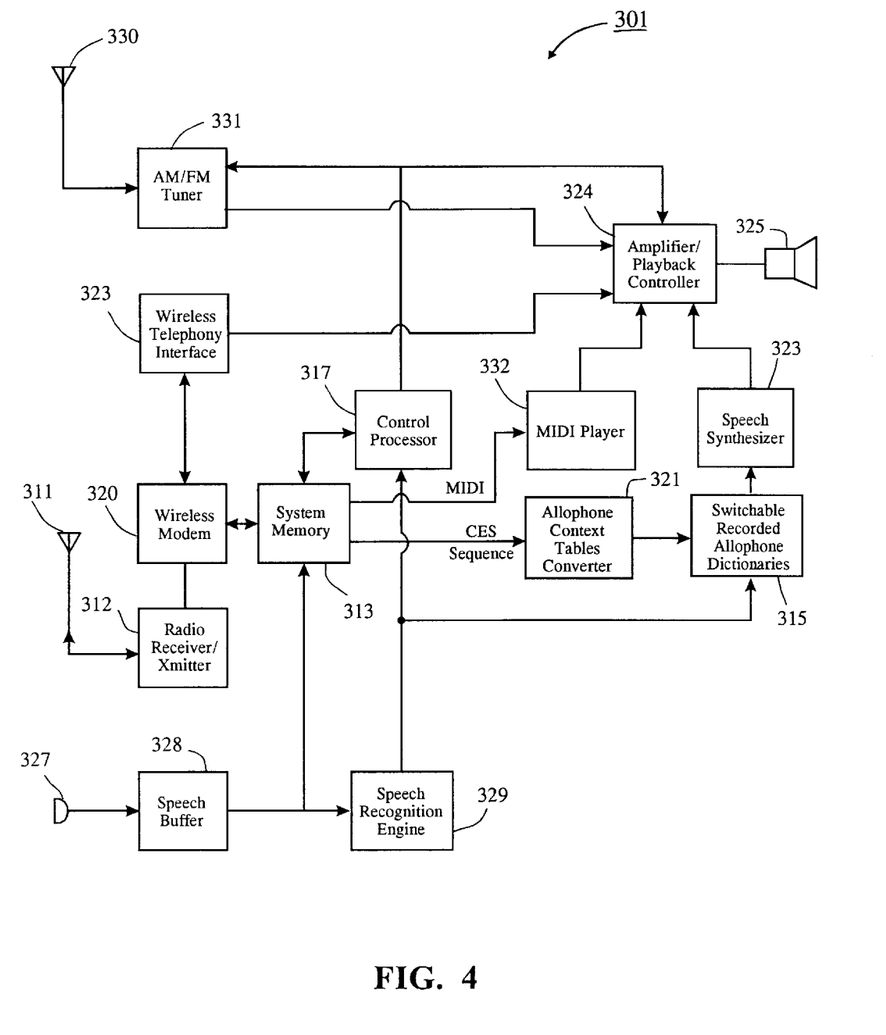
FIG. 4 is a block diagram of an embodiment of a user terminal according to the present invention.

Note, that the flowchart illustrated in FIG. 2B preferably operates with allophones, which in the case of the invention, represent segments of prerecorded voice. Those segments may be very short, e.g., allophones, or large segments, like diphones or even words. However, in the case of using allophones, the required memory for storing the dictionaries may be a few hundreds kilobytes, because the number of allophones for a particular language is quite limited. Storing large segments may require tens of Megabytes of memory and may render such a system substantially more expensive. Needless to say, that the fidelity of conversion may be somewhat better if longer speech segments are used. As a matter of preference, the invention illustrates using allophone context tables and dictionaries as conventionally described in U.S. Pat. No. 4,979,216 to Malsheen et al. and as illustrated in FIGS. 2A and 4.

Figure 3:
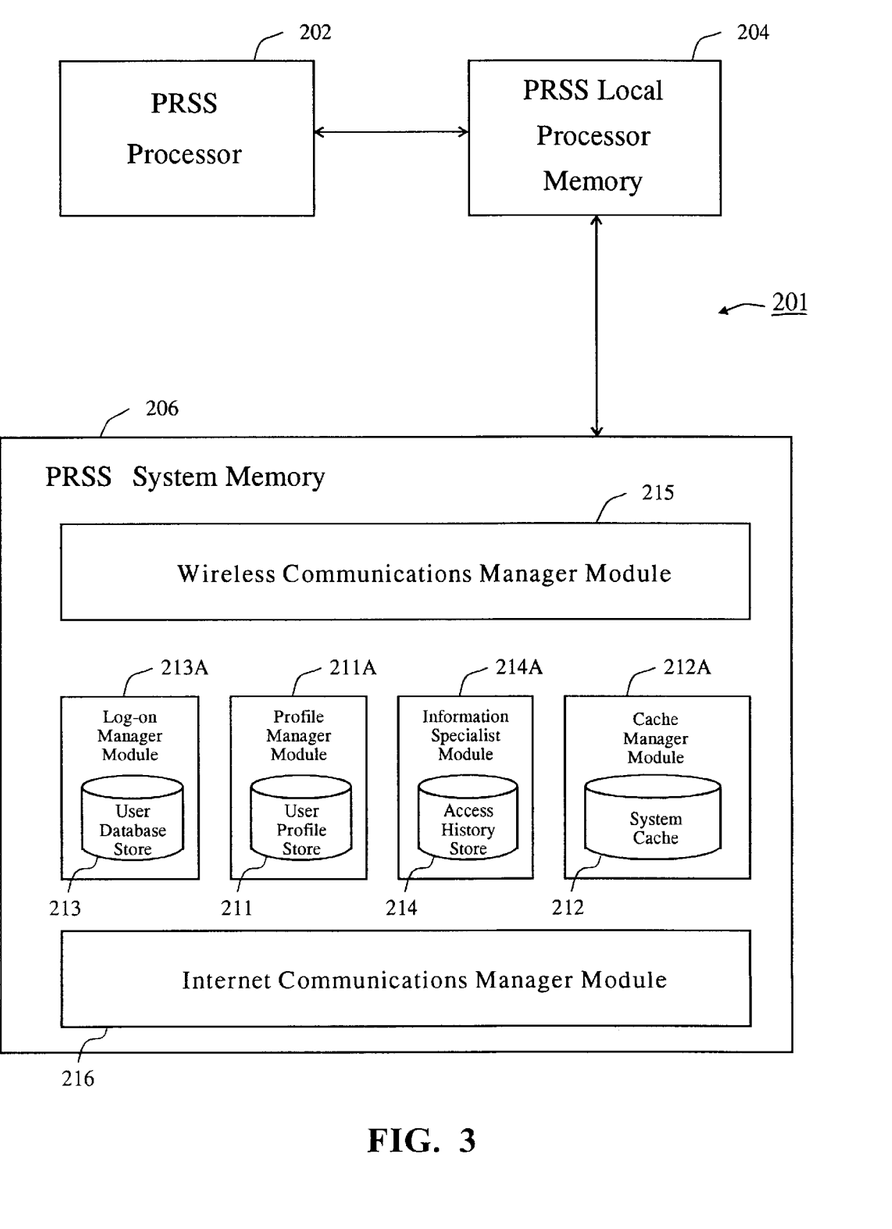
FIG. 3 is a block diagram of an embodiment of a personal radio station server according to the present invention.

Referring now to FIG. 3, a block diagram of a preferred embodiment of a personal radio station server (PRSS) 201 is shown. Such servers allow the users of the system (subscribers) to create their own personal radio stations. Using simple dialog-like interfaces at their user terminals, users define the classes of information that are of interest to them. The PRSS 201 includes a PRSS processor 202, a PRSS processor memory 204 operatively coupled to the processor 202, and a PRSS system memory 206 operatively coupled to the processor memory 204. The system memory 206 preferably includes storage capacity for various functional software modules and databases. As the PRSS performs the functions described herein, the PRSS processor 202 selects (loads) appropriate modules from the system memory 206 to be executed thereby in cooperation with the local processor memory 204 (e.g., RAM). Also, as required, appropriate data is retrieved from the system memory 206, as well as stored therein.

The PRSS 201 preferably includes the following functional modules and related data stores: profile manager module 211A and user profiles store 211; cache manager module 212A and system cache 212 (which is preferably in the form of RAM); log-on manager 213A and user database store 213; information specialist module 214A and access history store 214; wireless communications manager module 215; and Internet communications manager module 216.

The following is a description of certain exemplary administrative functions performed by the PRSS 201. When a new user is registered with the system 100, he/she receives a new user-id and password. This information is handled by the log-on manager module 213A and stored in the user database store 213. Duplicate user names are preferably not allowed. Conversely, a registered user may be removed from the system, e.g., when the user no longer subscribes for the services. In such case, the user-id and password are simply removed from the user database store 213. A system operator (not shown) having access to the PRSS 201 may perform this as well as other related functions.

The following is a description of certain exemplary profile management functions performed by the PRSS 201. Associated with each user is a profile, which defines the user's topic categories of interest. This profile is typically defined in terms of a list of topic categories, e.g. international news, sports news, business news, etc. This information is handled by the profile manager module 211A and such profiles are stored in the profiles database store 211. The user may, as desired, change the definition of his/her profile. Preferably, the user terminal audibly prompts the user to select topics from among menu selections. However, the user terminal may also be provided with a display on his user terminal such that the user may make his topic selections from a visual, rather than audio, presentation. Nonetheless, each time a change takes place, the old definition is replaced by the new definition. There are several profile manager modules on the market today, e.g., Point Communication Network (PCN), but in such conventional profile managers, unlike the present invention, the user profile is stored on the client terminal rather than on the server.

The following is a description of certain exemplary information (e.g., news) retrieval functions performed by the PRSS 201. When a user first logs on, or on his/her demand, the PRSS 201 retrieves information relating to his/her topic (s) of interest from the data repository 401 and delivers it to the user. If a pre-fetch process is implemented, as will be explained, the information of interest to the user may already by stored in the PRSS. Nonetheless, this is handled by the information specialist module 214A. The users' profile, stored in user profiles store 211, is used to select the news for retrieval. However, the PRSS 201 preferably does not send the same information to the user repeatedly. Thus, each time a user requests information, a record of the particular information is maintained in the access history store 214. In this way, the PRSS will only deliver the information that has been created or changed since the last time the user retrieved information. There are also several information services available in the market, e.g., PointCast. There are similar approaches that can be used to implement these functions.

The following is a description of certain exemplary cache management functions performed by the PRSS 201. The PRSS maintains a cache 212 preferably containing the information retrieved by various users. It is to be appreciated that information retrieved by the PRSS be stored in the cache 212 in order to speed up system performance; however, data from a content provider may also merely pass through the PRSS to the user terminal depending on the application. The cache manager module 212A handles the maintenance (e.g., storage and retrieval of data) of the cache 212. The use of a cache allows the system to take advantage of users common interests. That is, once particular data is brought in from the Internet repositories to the PRSS for one user, the data is stored in the cache 212. Thus, if another user requests the same data, the cache need merely be accessed to retrieve the data for response to the user, rather than accessing the network 402 again for the same data. Data is preferably stored in the cache 212 in one of two ways: (1) by storing the data retrieved as a result of a user request or (2) via a pre-fetching mechanism, i.e., using the profiles and noted access patterns of the user, the PRSS may anticipate which information may be of interest in the near future and retrieve such data so that the data is available at the PRSS upon user request. It is to be appreciated that the use of the cache significantly helps to improve the system's response time. Again, there are several cache-based systems on the market today, e.g., NetScape, which can be employed in the invention.

It is to be understood that the Internet communications manager module 216 controls communications functions between the PRSS 201 and the wide area network 402 to permit data to be accessed from the network, while the wireless communications manager module 215 controls communications functions between the PRSS 201 and the wireless data network 403 to permit data and control information to be transferred between the PRSS and the user terminal. As these modules perform conventional communications functions, a detailed explanation is not required for understanding the invention.

Referring now to FIG. 4, a block diagram of a preferred embodiment of a user terminal 301 is shown. The user terminal 301 preferably has two antennas: a broadcast radio antenna 330 and wireless communication antenna 311. The wireless data received by the radio receiver/transmitter 312 is demodulated by a wireless modem 320 and then stored in system memory 313. The control processor 317 extracts text information, CES and MIDI related sequences from the stored data. The CES data is retrieved from the system memory 313 and processed sequentially by an allophone context table converter 321, switchable recorded allophone dictionaries 315 and speech synthesizer 323. The functions of the converter 321, switchable dictionaries 315 and speech synthesizer 323 generally form the decompression engine 316 shown in FIG. 1 and essentially replicate the speech synthesis process described above with respect to the like components of the authoring system 101 and, therefore, explanation thereof is not repeated here. Similar components may be used to implement such functions in the user terminal. That is, the CES sequence, which includes the phonetic representation and prosody parameters of the transmitted data, is provided to the allophone context tables converter in a similar manner as shown in FIG. 2A.

It is to be understood that while only one block (315) is used to illustrate the prerecorded allophone dictionary arrangement in the user terminal in FIG. 2B, it is preferably similar to the arrangement in the authoring system 101 (FIG. 2A). That is, a user controlled switch (internal to block 315) is provided between the dictionaries that permits selection of the allophone dictionary that will be employed to provide data to the speech synthesizer. Similar to the authoring system, the selected dictionary in the user terminal determines the narrative voice that will be used to provide the requested data to the user during playback. However, in the user terminal the user may select the desired voice by providing a spoken command which is decoded by a speech recognition engine 329, as explained below. The engine 323 then sends a control signal to the switch to select the appropriate dictionary. Of course, in lieu of speech recognition, the user terminal could alternatively include a control button for accomplishing the same.

Text data, e.g. e-mail or a textual context of a Web page, is transformed by control processor 317 to CES data using a conventional TTS module (not shown) and then presented to the converter 321 for speech synthesis. The MIDI data is converted to analog music by the MIDI player 332. Both signals from the MIDI player 332 and the speech synthesizer 323 are mixed by amplifier/playback controller 324 which in turn drives the loudspeaker 325 to provide the requested data to the user.

There are preferably two additional sources of audio signals that can be processed by the users terminal 301, i.e., broadcast radio and cellular telephony. The AM/FM tuner 311, under control of the control processor 317, permits the user to tune to the desired radio station frequency. The audio signals received from the radio station are provided to the amplifier 324 and then to the loudspeaker 325. In the case of telephone conversation, the conventional wireless modem 320 passes the analog signal to a conventional wireless telephony interface 323 which than provides the telephony signals to the loudspeaker 325 via the amplifier 324 in a conventional manner. Telephony voice data from the user is processed through a microphone 327, a speech buffer 328, system memory 313, the wireless modem 320 the radio receiver/transmitter 312 to the antenna 311, in a conventional manner. It is to be appreciated that the amplifier/playback controller 324 mixes the outputs of all four radio signals, i.e., received from the speech codec 324, the MIDI player 332, the AM/FM tuner 331 and the wireless telephony interface 323, thus providing the playback to the user according to the application started by the user.

Speaking via the microphone 327, the user starts a dialog process and issues control commands to the control processor. As mentioned, user speech is sampled in the speech buffer 328. Then, the sampled speech is recognized by a conventional speech recognition engine 329. The speech recognition engine 329 decodes the speech and provides the recognized control commands to the control processor 317. In the case where the user provides a request to the system 100 to retrieve desired information, the request, in the form of a spoken utterance, is sampled by the speech buffer 328, decoded by the speech recognition engine 329, and sent to the control processor 317. The control processor 317 provides a request signal to the modem 320 for transmission using an appropriate wireless communication protocol by the antenna 311 via the radio transmitter 312. The request signal, also containing appropriate identification and authorization information (stored in the system memory 313) with regard to the user for system log-on procedures, is then transmitted across the wireless network 403 to the wide area network 402 to the PRSS 201 for retrieval and/or processing of the requested information. The PRSS 201 then retrieves the information, as previously explained, and sends the data to the user terminal 301 across the two networks (402 and 403) in the reverse direction.

In the case where a user vocal input must be delivered as a voice attachment to electronic mail, the output of the buffer 328 is recorded in the system memory 313, processed by the wireless modem 320, together with the rest of e-mail data, and transmitted using an appropriate wireless communication protocol by the transmitter 312 via the antenna 311. The e-mail message may be input by alphanumeric keys (not shown) on the user terminal. Also, the user terminal may have a display (not shown) for viewing e-mail and other text messages generated by the user. Also, the voice-initiated user request transmitted to the PRSS 201 may include a request for speech synthesized e-mail or other text messages (e.g., from other Internet web sites) stored in the PRSS 201 according to the invention.

In the case where the user provides voice-activated commands to control the audio playback, the same speech decoding path is followed as described above with regard to requests; however, the control processor 317 generates control signals, in response to the users' voice controls, and provides these control signals to the amplifier/playback controller 324. Such voice-activated control functions may include, but are not limited to, voice rate control, audio playback level, reverse, forward, fast forward. The playback controller 324 then performs the appropriate function on the audio signals provided thereto in response to the control signal from the control processor 317.

Accordingly, it is to be appreciated that the singlecast interactive radio system of the present invention provides many features and advantages not previously available in conventional systems. For example, the system: delivers large amounts of information to radio listeners wirelessly at a price comparable to wired communications, and with a voice quality comparable to conventional radio; provides a mobile user with a low cost speech-based wireless network terminal, which preferably integrates analog broadcast services with cellular telephony and digital data communication services, and preferably substitutes mechanically and expands functionally conventional mobile radio devices; allows a wide array of interactive radio services to mobile users, e.g., Internet browsing, alphanumeric and voice paging, route guidance, access to digitized voice and data repositories like audio books, local weather and traffic information, stock market quotes, newspapers and magazines content; improves the safety of customers in vehicles by providing them with a hands-free voice-based interface with the user mobile terminal, including, for example, tuning to broadcast stations, cellular telephone dialing, switching between various available applications; introduces advanced functions to audio playback control, by incorporation of such voice-activated commands as voice rate control, audio playback level, reverse, forward and fast forward commands; provides voice-based retrieval of text information, e.g., electronic mail, or text files received from Internet Web sites; allows a user to generate electronic mail with voice, due to lack or impossibility of using a keyboard, as well as in view of safety reasons; creates a personal virtual radio station for every user, such virtual radio station allowing a user to define a hot-list of information of interest, pre-fetch information as soon as it becomes available, and the system delivering such information to the user's mobile terminal on request; increases geographical coverage of interactive radio services by using various wireless communication networks which proliferate in different countries; improves reliability and decreasing cost of using wireless data communication technology for delivering digital voice and data, by achieving a very low voice compression ratio, and using store and forward technology; enables content providers with simple authorizing tools to provide a highly compressed voice content; and offers an open application development platform by using standards and industry approved tools, protocols and interfaces, in order to facilitate creating of new interactive radio applications.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An information signal content authoring system, comprising:
   a speech analyzer, responsive to a spoken utterance signal provided by a narrator, the spoken utterance signal being representative of information available to the narrator, the speech analyzer generating a speech signal representative of at least one prosodic parameter associated with the narrator;
   a text-to-speech converter, responsive to a text signal representative of the information available to the narrator, the converter generating a phonetic representation signal from the text signal and synthesizing a speech signal from the text signal, the text-to-speech converter also generating at least one prosodic parameter from the text signal;
   a spectrum comparator, operatively coupled to the speech analyzer and the text-to-speech converter, for comparing the at least one prosodic parameter of the speech signal generated by the speech analyzer to the speech signal synthesized by the converter and generating a variance signal indicative of a spectral distance between the two speech signals, the variance signal being provided to the text-to-speech converter to adjust the at least one prosodic parameter; and
   an output portion, operatively coupled to the text-to-speech converter, for outputting the phonetic representation signal and the at least one prosodic parameter from the converter as a composite encoded signal representative of information content available to the narrator.

2. The system of claim 1, wherein the output portion further comprises editing means, response to editing commands issued by the narrator, for editing at least a portion of the composite encoded signal.

3. The system of claim 1, wherein the text-to-speech converter further comprises:
   a text-to-phonemes converter for converting the text signal to the phonetic representation signal;
   a phonemes-to-allophones converter, operatively coupled to the text-to-speech converter, for converting phonemes associated with the phonetic representation signal to allophones;
   storage means, operatively coupled to the phonemes-to-allophones converter, for storing previously recorded allophones characteristic of at least one narration voice and for selecting the previously recorded allophones which substantially match the allophones provided by the allophone converter; and
   speech synthesizing means, operatively coupled to the storage means, for generating the synthesized speech signal representative of the text signal in response to the previously recorded allophones from the storage means.

4. The system of claim 3, wherein the storage means of the text-to-speech conversion means further comprises a plurality of dictionaries of previously recorded allophones, each dictionary corresponding to a different narration voice, and means for switching between the dictionaries, at the request of the narrator, such that allophones from the selected dictionary are provided to the synthesizing means.

5. The system of claim 1, further comprising audio feedback means, operatively coupled to the text-to-speech converter, for providing the narrator with an audio feedback of the synthesized speech signal.

6. The system of claim 5, further comprising means for mixing a background audio signal with the synthesized speech signal feedback to the narrator.

7. An information signal content authoring system, comprising:

speech analysis means, responsive to a spoken utterance signal provided by a narrator, the spoken utterance signal being representative of information available to the narrator, the speech analysis means generating a speech signal representative of at least one prosodic parameter associated with the narrator;

text-to-speech conversion means, responsive to a text signal representative of the information available to the narrator, the conversion means generating a phonetic representation signal from the text signal and synthesizing a speech signal from the text signal, the text-to-speech conversion means also generating at least one prosodic parameter from the text signal;

comparing means, operatively coupled to the speech analysis means and the conversion means, for comparing the at least one prosodic parameter of the speech signal generated by the speech analysis means to the speech signal synthesized by the conversion means and generating a variance signal indicative of a spectral distance between the two speech signals, the variance signal being provided to the text-to-speech conversion means to adjust the at least one prosodic parameter; and output means, operatively coupled to the speech analysis means, the conversion means and the comparing means, for outputting the phonetic representation signal and the at least one prosodic parameter from the conversion means as a composite encoded signal representative of information content available to the narrator.

8. The system of claim 7, wherein the output means further comprises editing means, response to editing commands issued by the narrator, for editing at least a portion of the composite encoded signal.

9. The system of claim 7, wherein the text-to-speech conversion means further comprises:

a text-to-phonemes converter for converting the text signal to the phonetic representation signal;

a phonemes-to-allophones converter, operatively coupled to the text-to-speech converter, for converting phonemes associated with the phonetic representation signal to allophones;

storage means, operatively coupled to the phonemes-to-allophones converter, for storing previously recorded allophones characteristic of at least one narration voice and for selecting the previously recorded allophones which substantially match the allophones provided by the allophone converter; and speech synthesizing means, operatively coupled to the storage means, for generating the synthesized speech signal representative of the text signal in response to the previously recorded allophones from the storage means.

10. The system of claim 9, wherein the storage means of the text-to-speech conversion means further comprises a plurality of dictionaries of previously recorded allophones, each dictionary corresponding to a different narration voice, and means for switching between the dictionaries, at the request of the narrator, such that allophones from the selected dictionary are provided to the synthesizing means.

11. The system of claim 7, further comprising audio feedback means, operatively coupled to the text-to-speech conversion means, for providing the narrator with an audio feedback of the synthesized speech signal.

12. The system of claim 11, further comprising means for mixing a background audio signal with the synthesized speech signal feedback to the narrator.

* * * * *